United States Patent
Kuang et al.

(10) Patent No.: US 12,114,214 B2
(45) Date of Patent: *Oct. 8, 2024

(54) BANDWIDTH PART OPERATION DURING HANDOVER PROCEDURE

(71) Applicant: Panasonic Intellectual Property Corporation of America, Torrance, CA (US)

(72) Inventors: Quan Kuang, Langen (DE); Hidetoshi Suzuki, Kanagawa (JP); Ming-Hung Tao, Langen (DE); Ankit Bhamri, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,682

(22) Filed: Sep. 12, 2023

(65) Prior Publication Data

US 2023/0422114 A1   Dec. 28, 2023

Related U.S. Application Data

(63) Continuation of application No. 17/896,824, filed on Aug. 26, 2022, now Pat. No. 11,792,699, which is a
(Continued)

(30) Foreign Application Priority Data

Feb. 15, 2018   (EP) ..................... 18157042

(51) Int. Cl.
*H04W 36/00*   (2009.01)
*H04W 74/0833*   (2024.01)

(52) U.S. Cl.
CPC ... *H04W 36/0072* (2013.01); *H04W 36/0016* (2013.01); *H04W 74/0833* (2013.01)

(58) Field of Classification Search
CPC ......... H04W 36/0072; H04W 36/0016; H04W 74/0833; H04W 36/08; H04W 88/02; H04W 88/08
See application file for complete search history.

(56) References Cited

U.S. PATENT DOCUMENTS

2012/0113943 A1   5/2012   Jung et al.
2013/0039344 A1   2/2013   Lee et al.
(Continued)

FOREIGN PATENT DOCUMENTS

CA   3096830 A1   9/2020
KR   20110005664 A   1/2011
(Continued)

OTHER PUBLICATIONS

3GPP TSG-RAN WG2 Meeting #100 Vancouver, Canada, Jan. 22-26, 2018 Agenda Item 10.4.1.5.3 Title BWP configuration during handover Document No. R2-1801270 (Year: 2018).*
(Continued)

*Primary Examiner* — Nizar N Sivji
(74) *Attorney, Agent, or Firm* — Seed IP Law Group LLP

(57) ABSTRACT

The present disclosure relates to a mobile terminal for performing a handover procedure in a mobile communication system from a source to a target base station. The target base station is configured for the mobile terminal with at least a first and a different second bandwidth part within its cell bandwidth. The mobile terminal comprises: a transceiver which, in operation, receives from the source base station a handover command message including information regarding the configured at least first and second bandwidth part; and a processor which, in operation and upon reception
(Continued)

of the handover command message, activates in the transceiver at least a selected one of the configured at least first or second bandwidth part, and controls the transceiver to perform, over the activated at least one of the configured at least first or second bandwidth part, communication with the target base station as part of the handover procedure.

7 Claims, 9 Drawing Sheets

Related U.S. Application Data continuation of application No. 16/991,391, filed on Aug. 12, 2020, now Pat. No. 11,470,519, which is a continuation of application No. PCT/EP2019/050822, filed on Jan. 14, 2019.

(56) References Cited

U.S. PATENT DOCUMENTS

| | | | |
|---|---|---|---|
| 2013/0107862 A1* | 5/2013 | Yang | H04L 5/001 370/331 |
| 2016/0127955 A1 | 5/2016 | Damnjanovic et al. | |
| 2017/0126439 A1 | 5/2017 | Yoshimoto et al. | |
| 2018/0049068 A1 | 2/2018 | Agiwal et al. | |
| 2019/0149421 A1* | 5/2019 | Jin | H04L 5/0078 370/331 |
| 2019/0182716 A1* | 6/2019 | Futaki | H04W 76/10 |
| 2020/0229089 A1 | 7/2020 | Tang | |
| 2020/0244429 A1 | 7/2020 | Bao | |
| 2020/0344649 A1 | 10/2020 | Xu et al. | |
| 2020/0366453 A1 | 11/2020 | Shen | |

FOREIGN PATENT DOCUMENTS

| | | | |
|---|---|---|---|
| KR | 20130014585 | A | 2/2013 |
| RU | 2627028 | C2 | 8/2017 |
| TW | 201735704 | A | 10/2017 |
| WO | WO 2011129598 | A2 | 10/2011 |
| WO | WO 2019098750 | A1 | 5/2019 |

OTHER PUBLICATIONS

3GPP TSG RAN WG1 #91 Reno, NV, USA, Nov. 27-Dec. 1, 2017 Agenda item: 7.3.4.1 Title: Open Issues on BWP Document No. R1-1720693 (Year: 2017).*

Korean Notice of Preliminary Rejection, dated Dec. 26, 2023, for Korean Patent Application No. 10-2020-7026422. (13 pages) (with English translation).

3GPP, "3rd Generation Partnership Project; Technical Specification Group Radio Access Network; NR; NR and NG-RAN Overall Description; Stage 2 (Release 15)," 3GPP TS 38.300 V1.1.0, Oct. 2017, 59 pages. (R2-1711936).

Ericsson, "Text proposal on 38.331," R1-1801161, Agenda: 7, 3GPP TSG RAN WG1 Meeting AH 1801, Vancouver, Canada, Jan. 22-26, 2018, 120 pages.

Huawei, HiSilicon, "Introduction of QoE Measurement Collection for LTE," R2-1712075, Change Request, 36.306, CR1512, rev1, Current version: 14.4.0, 3GPP TSG-RAN2 Meeting #99bis, Prague, Czech, Oct. 9-13, 2017, 5 pages.

Panasonic, "Remaining Issues on Bandwidth Part Operation," R1-1720505, Agenda Item: 7.3.4.1, 3GPP TSG-RAN WG1 Meeting 91, Reno, USA. Nov. 27-Dec. 1, 2017, 3 pages.

Samsung, "On Bandwidth Part Operation," R1-1720349, Agenda Item: 7.3.4.1, 3GPP TSG RAN WG1 Meeting #91, Reno, USA, Nov. 27-Dec. 1, 2017, 5 pages.

Samsung, "Remaining issues on bandwidth part configuration," R2-1713868, Agenda Item: 10.4.1.3.3, 3GPP TSG-RAN WG2 NR #100 Meeting, Reno, USA, Nov. 27-Dec. 1, 2017, 6 pages.

3GPP, "3rd Generation Partnership Project; Technical Specification Group Radio Access Network; NR; NR and NG-RAN Overall Description; Stage 2 (Release 15)," 3GPP TS 38.300 V2.0.0, Dec. 2017. (68 pages).

3GPP, "3rd Generation Partnership Project; Technical Specification Group Radio Access Network; Study on New Radio Access Technology; Radio Access Architecture and Interfaces (Release 14)," 3GPP TR 38.801 V2.0.0, Mar. 2017. (90 pages).

3GPP, "3rd Generation Partnership Project; Technical Specification Group Radio Access Network; Study on Scenarios and Requirements for Next Generation Access Technologies; (Release 14)," 3GPP TR 38.913 V14.1.0, Dec. 2016. (38 pages).

CATT, "BWP model," R2-1710275, Agenda Item: 10.2.3, 3GPP TSG-RAN WG2 Meeting #99bis, Prague, Czech Republic, Oct. 9-13, 2017. (4 pages).

CATT, "BWP selection in handover," R2-1712863, Agenda Item: 10.2.3, 3GPP TSG-RAN WG2 #100, Reno, USA, Nov. 27-Dec. 1, 2017. (3 pages).

Chinese Office Action, issued Dec. 24, 2021, for Chinese Patent Application No. 201980013576.2. (23 pages) (with English Translation).

Communication pursuant to Article 94(3) EPC, dated Jul. 7, 2020, for European Patent Application No. 18 157 042.5-1218. (10 pages).

English Translation of Japanese Office Action, issued Feb. 21, 2023, for Japanese Patent Application No. 2020-538843. (6 pages).

English translation of Taiwanese Office Action, issued Jun. 30, 2022, for Taiwanese Patent Application No. 108104964. (18 pages).

Ericsson, "Dual Cell HSDPA Mobility," Tdoc R2-083964, Agenda Item: 7.5.11, 3GPP TSG-RAN WG2 #63, Jeju, Korea, Aug. 18-22, 2008. (2 pages).

Extended European Search Report, dated Apr. 24, 2018, for European Patent Application No. 18157042.5-1214. (28 pages).

Huawei, HiSilicon, "Control plane impacts for Bandwidth Parts," R2-1710457, Agenda item: 10.2.3, 3GPP TSG-RAN WG2 Meeting #99bis, Prague, Czech Republic, Oct. 9-13, 2017. (5 pages).

InterDigital Inc., "Control Plane Impacts of BWP," R2-1712795, Agenda Item: 10.2.3, 3GPP TSG-RAN WG2 Meeting #100, Reno, USA, Nov. 27-Dec. 1, 2017. (4 pages).

International Search Report, mailed Mar. 25, 2019, for International Application No. PCT/EP2019/050822, 8 pages.

Mediatek Inc., "Basic Framework for Bandwidth Part Operation," R2-1710864, Agenda Item: 10.2.3, 3GPP TSG-RAN WG2 #99-bis, Prague, Czech, Oct. 9-13, 2017. (4 pages).

Oppo, "Discussion on Make-Before-Break Handover for NR," R2-1801785, resubmission of R2-1800055, Agenda Item: 10.2.7, 3GPP TSG-RAN WG2#101, Athens, Greece, Feb. 26-Mar. 2, 2018, 4 pages.

Oppo, "Discussion on RACH-less Handover for NR," R2-1801786, Resubmission of R2-1712220, Agenda Item: 10.2.7, 3GPP TSG-RAN WG2#101, Athens, Greece, Feb. 26-Mar. 2, 2018. (5 pages).

Panasonic, "Bandwidth part operations during handover," R2-1802011, Agenda Item: 10.4.1.5.3, 3GPP TSG-RAN WG2 Meeting #101, Athens, Greece, Feb. 26-Mar. 2, 2018. (4 pages).

Qualcomm Incorporated, "BWP configuration during handover," R2-1801270, Agenda item: 10.4.1.5.3, 3GPP TSG-RAN WG2 Meeting #100, Vancouver, Canada, Jan. 22-26, 2018. (4 pages).

Qualcomm Incorporated, "Open Issues on BWP," R1-1720693, Agenda item: 7.3.4.1, 3GPP TSG RAN WG1 #91, Reno, NV, USA, Nov. 27-Dec. 1, 2017. (16 pages).

Qualcomm Incorporated, "Remaining control plane issues of BWP," R2-1713885, Agenda item: 10.2.3, 3GPP TSG-RAN WG2 Meeting #100, Reno, USA, Nov. 27-Dec. 1, 2017. (7 pages).

Qualcomm Incorporated, "URLLC DL pre-emption and UL suspension indication channel design," R1-1720692, Agenda item: 7.3.3.6, 3GPP TSG-RAN WG1 #91, Reno, Nevada, US, Nov. 27-Dec. 1, 2017. (10 pages).

Notice of Allowance, dated Jul. 25, 2024, for Korean Application No. 20207026422. (22 pages) (with English translation of claims).

* cited by examiner

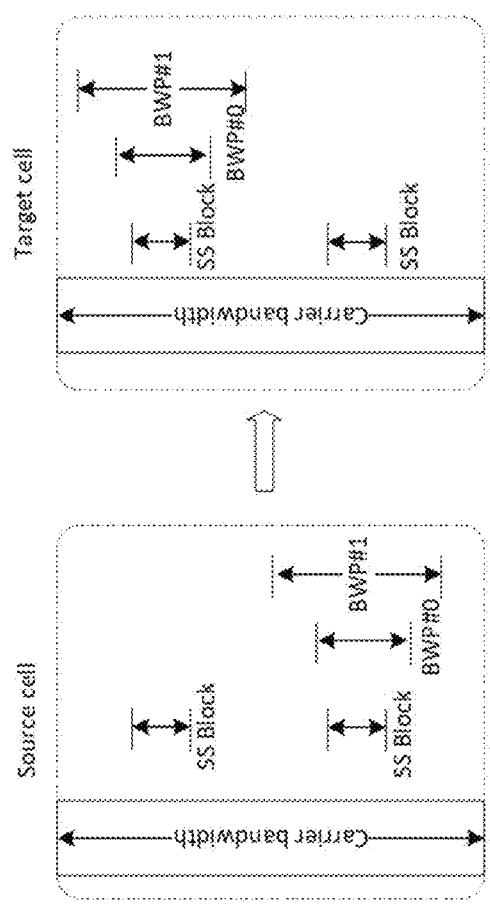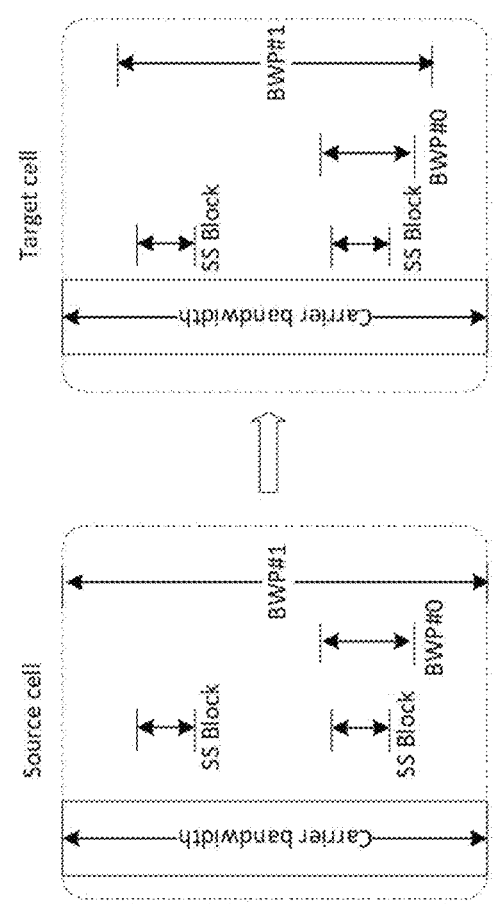
Fig. 2A
Fig. 2B

Fig. 7

| RACH #0 | DL BWP#0 | UL BWP#0 |
| RACH #1 | DL BWP#0 | UL BWP#1 |
| RACH #2 | DL BWP#1 | UL BWP#0 |
| RACH #3 | DL BWP#1 | UL BWP#1 |
| ⋮ | ⋮ | ⋮ |

| PUSCH #0 | DL BWP#0 | UL BWP#0 |
|---|---|---|
| PUSCH #1 | DL BWP#0 | UL BWP#1 |
| PUSCH #2 | DL BWP#1 | UL BWP#0 |
| PUSCH #3 | DL BWP#1 | UL BWP#1 |
| ⋮ | ⋮ | ⋮ |

Fig. 9

BANDWIDTH PART OPERATION DURING HANDOVER PROCEDURE

TECHNICAL FIELD

The present disclosure relates to a mobile terminal performing a handover procedure in a wireless communication system from a source base station to a target base station.

DESCRIPTION OF THE RELATED ART

Currently, the 3$^{rd}$ Generation Partnership Project (3GPP) focuses on the next release (Release 15) of technical specifications for the next generation cellular technology, which is also called fifth generation (5G).

At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and the study has laid the foundation of the Release 15 work item (WI) which will define the first 5G standard.

5G new radio (NR) provides a single technical framework addressing all usage scenarios, requirements and deployment scenarios defined in 3GPP TSG RAN TR 38.913 v14.1.0, "Study on Scenarios and Requirements for Next Generation Access Technologies", December 2016 (available at www.3gpp.org), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

The forward compatibility, anticipating future use cases/deployment scenarios are also provided in 5G. The backward compatibility to Long Term Evolution (LTE) is not required, which facilitates a completely new system design and/or the introduction of novel features.

As summarized in one of the technical reports for the NR study item (3GPP TSG TR 38.801 v2.0.0, "Study on New Radio Access Technology; Radio Access Architecture and Interfaces", March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

One of the design targets in NR is to enhance the user's mobility with minimizing the interruption of ongoing traffic if any, and at the same time without increasing the user equipment power consumption. At RAN #78, RAN2 was tasked to investigate how the IMT-2020 requirement on 0ms handover interruption time can be addressed for LTE and NR within the Rel-15 time frame. At a first step, handover procedure in LTE has been discussed as a baseline design in NR. There are ongoing discussions in 3gpp working groups regarding what functionalities need to be added or modified for NR mobility enhancement.

The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

BRIEF SUMMARY

One non-limiting and exemplary embodiment enables the mobile terminal to more quickly perform handover from a source base station to a target base station. When the target base station already during handover configures plural bandwidth parts for the mobile terminal and signaling same configurations to the mobile terminal, the mobile terminal can instantaneously start communicating (again) during the handover over a suitable bandwidth part configuration with the target base station. After handover, additional reconfiguration attempts may be avoided.

In an embodiment, the techniques disclosed here feature a mobile terminal for performing a handover procedure in a mobile communication system from a source base station to a target base station. The target base station is configured for the mobile terminal with at least a first bandwidth part and a different second bandwidth part within its cell bandwidth. The mobile terminal comprises: a transceiver which, in operation, receives from the source base station a handover command message including information regarding the configured at least first bandwidth part and second bandwidth part; and processing circuitry, such as a processor which, in operation and upon reception of the handover command message, activates in the transceiver at least a pre-selected one of the configured at least first bandwidth part or second bandwidth part, and controls the transceiver to perform, over the activated at least one of the configured at least first bandwidth part or second bandwidth part, communication with the target base station as part of the handover procedure.

In another general aspect, the techniques disclosed here feature a mobile terminal for performing a handover procedure in a mobile communication system from a source base station to a target base station. The target base station is configured for the mobile terminal with at least a first bandwidth part and a different second bandwidth part within its cell bandwidth. The mobile terminal comprises: a transceiver which, in operation, receives from the source base station a handover command message including information regarding the configured at least first bandwidth part and second bandwidth part; and a processor which, in operation and upon reception of the handover command message, selects and activates in the transceiver at least one of the configured at least first bandwidth part or the second bandwidth part, and controls the transceiver to perform, over the selected and activated at least one of the configured at least first bandwidth part or the second bandwidth part, communication with the target base station as part of the handover procedure.

In further general aspect, the techniques disclosed here feature a target base station for performing a handover procedure of a mobile terminal in a mobile communication system from a source base station. The target base station is capable of communicating with the mobile terminal over each of at least a first bandwidth part and a different second bandwidth part within its cell bandwidth. The target base station comprises: a transceiver which, in operation, receives from the source base station a handover request message including information regarding the capability of the mobile terminal to communicate over at least the first bandwidth part and second bandwidth part; and a processor which, in operation and upon reception of the handover request message, controls the transceiver to configure for the mobile terminal at least the first bandwidth part and the second bandwidth part, and controls the transceiver to transmits to the source base station a handover request acknowledge message, wherein the handover request acknowledge message includes information regarding the configured at least first bandwidth part and second bandwidth part.

In yet another general aspect, the techniques disclosed here feature a method for performing a handover procedure of a mobile terminal in a mobile communication system from a source base station to a target base station. The target base station is configured for the mobile terminal with at least a first bandwidth part and a different second bandwidth part within its cell bandwidth. The method comprises the steps of: receiving from the source base station a handover command message including information regarding the configured at least first bandwidth part and second bandwidth part; and upon reception of the handover command message, activating at least a pre-selected one of the configured at least first bandwidth part or second bandwidth part, and communicating, over the activated at least one of the configured at least first bandwidth part or second bandwidth part, with the target base station as part of the handover procedure.

In an even further general aspect, the techniques disclosed here feature another method for performing a handover procedure of a mobile terminal in a mobile communication system from a source base station to a target base station. The target base station is configured for the mobile terminal with at least a first bandwidth part and a different second bandwidth part within its cell bandwidth. The method comprises the steps of: receiving from the source base station a handover command message including information regarding the configured at least first bandwidth part and second bandwidth part; and upon reception of the handover command message, selecting and activating at least one of the configured at least first bandwidth part or the second bandwidth part, and communicating, over the selected and activated at least one of the configured at least first bandwidth part or the second bandwidth part, with the target base station as part of the handover procedure.

In yet another general aspect, the techniques disclosed here feature a further method for a target base station to perform a handover procedure of a mobile terminal in a mobile communication system from a source base station The target base station being capable of communicating with the mobile terminal over each of at least a first bandwidth part and a different second bandwidth part within its cell bandwidth. The method comprises the steps of: receiving from the source base station a handover request message including information regarding the capability of the mobile terminal to communicate over at least the first bandwidth part and second bandwidth part; and upon reception of the handover request message, configuring for the mobile terminal at least the first bandwidth part and the second bandwidth part, and transmitting to the source base station a handover request acknowledge message, wherein the handover request acknowledge message includes information regarding the configured at least first bandwidth part and second bandwidth part.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIGS. 2A and 2B illustrate exemplary scenarios with bandwidth part configurations in a source and target cell before and after handover;

FIG. 7 show an association table for the handover procedure according to FIG. 6;

FIG. 9 show another association table for the handover procedure according to FIG. 8.

DETAILED DESCRIPTION

In 3GPP NR, bandwidth part (BWP) operation is introduced as a new feature. A BWP of a group of contiguous physical resource blocks (PRBs). It defines the UE's operating bandwidth within the cell's operating bandwidth. Furthermore, the bandwidth of a BWP equals to or is smaller than the maximal bandwidth capability supported by a UE.

For each UE-specific serving cell, one or more downlink BWPs and one or more uplink BWPs can be configured by dedicated radio resource control, RRC, signaling for a UE. The configuration of a BWP may include the following properties: Numerology, frequency location (e.g., center frequency), and bandwidth (e.g., number of PRBs), where the numerology means the subcarrier spacing and the cyclic prefix.

However, in Release-15, for a UE, there is at most one active downlink BWP and at most one active uplink BWP at a given time for a serving cell. A UE only expects the communication from/to gNB via the active BWPs, meaning that the UE may monitor only the active downlink BWP for PDCCH and possible PDSCH, and may transmit PUSCH/PUCCH only in the active uplink BWP.

NR supports the case that a single scheduling DCI (downlink control information) can switch the UE's active BWP from one to another among the BWPs that have been configured for the UE. This is referred to as (dynamic) BWP adaptation.

Bandwidth adaptation is described in the 3GPP technical specification to New Radio, NR, and Next Generation, NG,-Radio Access Network, RAN, (3GPP TSG TS 38.300 V.2.0.0, "NR; NR and NG-RAN Overall Description", December 2017) as follows:

With Bandwidth Adaptation (BA), the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP) and BA is achieved by configuring the UE with BWP(s) and telling the UE which of the configured BWPs is currently the active one.

Figure 1A:
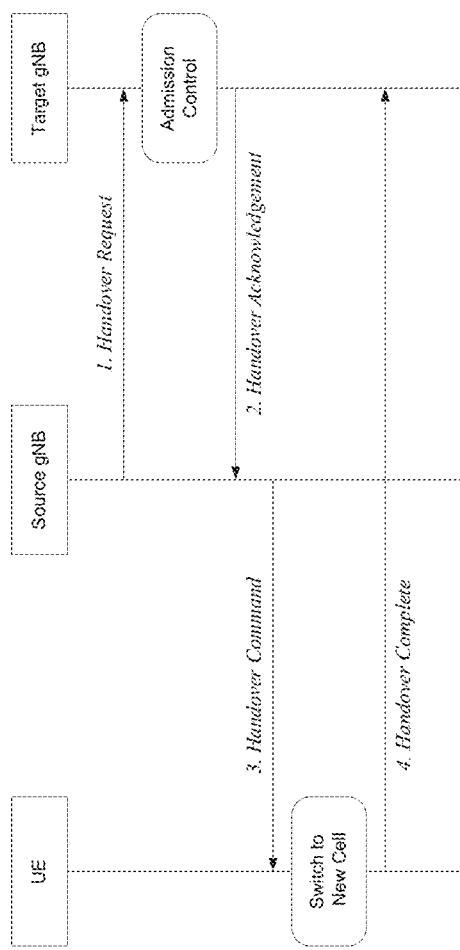
FIGS. 1A and 1B show a sequence diagram of an exemplary handover procedure, and a scenario explaining bandwidth adaptation over time.
Figure 1B:
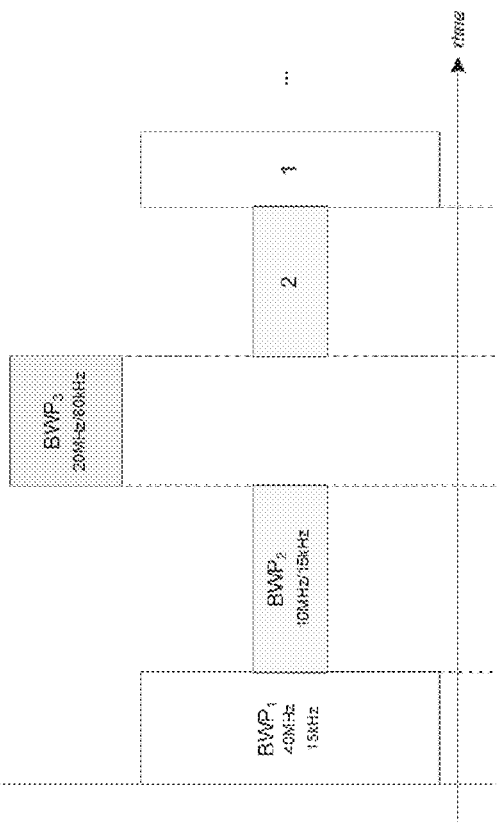

It is possible to conceive a scenario where 3 different BWPs are configured as shown in FIG. 1B, each having same or different center frequency, different (band-) width and/or different subcarrier spacing:

BWP1 with a width of 40 MHz and subcarrier spacing of 15 kHz;

BWP2 with a width of 10 MHz and subcarrier spacing of 15 kHz; and

BWP3 with a width of 20 MHz and subcarrier spacing of 60 kHz.

A general description of network controlled mobility is given in the 3GPP technical specification to New Radio, NR, and Next Generation, NG,-Radio Access Network, RAN, (3GPP TSG TS 38.300 V.2.0.0, "NR; NR and NG-RAN Overall Description", December 2017). Network controlled mobility applies to UEs in RRC_CONNECTED and is categorized into two types of mobility: cell level mobility and beam level mobility.

Cell Level Mobility requires explicit RRC signaling to be triggered, e.g., handover. For inter-gNB handover, the signaling procedures include at least the following elemental components illustrated in FIG. 9.2.3.1-1, which is reproduced herein as FIG. 1A for consistency reasons. Separate therefrom, Beam Level Mobility does not require explicit RRC signaling to be triggered—it is dealt with at lower layers—and RRC is not required to know which beam is being used at a given point in time.

As shown in FIG. 1A, the RRC driven mobility is responsible for the cell level mobility, e.g., handover. Handover signaling procedures adopt the same principle as Rel-13 LTE. For inter-gNB handover, the signaling procedures consist of at least the following elemental components.

1. The source gNB initiates handover and issues a Handover Request over the Xn interface.
2. The target gNB performs admission control and provides the RRC configuration as part of the Handover Acknowledgement.
3. The source gNB provides the RRC configuration to the UE in the Handover Command. The Handover Command message includes at least cell ID and information required to access the target cell so that the UE can access the target cell without reading system information. For some cases, the information required for contention based and contention free random access can be included in the Handover Command message. The access information to the target cell may include beam specific information, if any.
4. The UE moves the RRC connection to the target gNB and replies the Handover Complete.

The handover mechanism triggered by RRC requires the UE at least to reset the MAC entity and re-establish RLC. RRC managed handovers with and without PDCP entity re-establishment are both supported. For DRBs using RLC AM mode, PDCP can either be re-established together with a security key change or initiate a data recovery procedure without a key change. For DRBs using RLC UM mode and for SRBs, PDCP can either be re-established together with a security key change or remain as it is without a key change.

Data forwarding, in-sequence delivery and duplication avoidance at handover can be facilitated when the target gNB uses the same DRB configuration and QoS flow to DRB mapping as the source gNB. Timer based handover failure procedure is supported in NR. RRC connection re-establishment procedure is used for recovering from handover failure.

It shall be mentioned that the elemental components illustrated in FIG. 1A not only characterize the inter-gNB handover but are also part of the intra-NR RAN Handover. For reasons of brevity, reference is made to FIG. 9.2.3.2.1-1 disclosing particular aspects to an intra-AMF/UPF handover. In this figure, the Handover Request is in message 3, the Handover (Request) Acknowledge is in message 5, the Handover Command is part of the communication 6 and the Handover Complete is part of the communication 8.

Importantly, the elemental components of the presently known handover do not support the concept of bandwidth adaptation. Recognizing these shortcomings the present disclosure strives to improve the handover procedure.

Non-limiting and exemplary embodiments facilitate the mobile terminal to more quickly perform handover from a source base station to a target base station and minimize the interruption of the ongoing data transmission (if any) and avoiding increasing the mobile terminal power consumption.

When the target base station already during handover configures plural bandwidth parts for the mobile terminal and signaling same configurations to the mobile terminal, the mobile terminal can instantaneously start communicating (again) during the handover over a suitable bandwidth part configuration with the target base station. After handover, additional reconfiguration or bandwidth part adaptation attempts may no longer be necessary.

It shall be mentioned that the Xn interface for inter-gNB message exchange is chosen for the purpose of illustration of the current disclosure. It should not be regarded as the limitation of the current disclosure, which can be applied in a straightforward way to inter-AMF/UPF handover case where the information regarding bandwidth part usage mentioned in this disclosure would be exchange via the interface between gNB and core network.

For a more comprehensive discussion of the advantages provided by the present disclosure, two different scenarios shall be described in further detail. From this description it shall become apparent that there are further synergistic effects which can be achieved when considering bandwidth adaptation at the handover.

Referring to FIG. 2A, an exemplary scenario is shown where a mobile terminal is configured with plural bandwidth parts in the source and target cell, e.g., before and after handover.

This exemplary scenario depicts a situation where the mobile terminal performs a handover from a source base station (more specifically from the source cell which is served by the source base station) to the target base station (more specifically in the target cell which is served by the target base station). In both, the source cell and the target cell the mobile terminal is configured with plural bandwidth parts, e.g., a first and a second bandwidth part with corresponding indexes #0 and #1.

Particularly, in the source cell and the target cell the configuration (e.g., location and bandwidth) of the first bandwidth part (referred to as BWP with index #0) and the second bandwidth part (referred to as BWP with index #1) is shown with regard to the Synchronization Signal, SS, block in the carrier bandwidth, e.g., in the frequency domain. As the indicated first and second bandwidth parts are included in the same carrier bandwidth also occupied by the SS block, they both correspond to downlink bandwidth parts for the mobile terminal. The further description, however, equally applies for uplink bandwidth part such that a specific distinction has been omitted for reasons of simplicity.

In the source cell, the first and second bandwidth parts are both configured in central alignment (in frequency domain) with one (e.g., the lower) SS block, and in the target cell, the first and second bandwidth parts are both configured in central alignment (in frequency domain) with another (e.g., the upper) SS block. In other words, in this exemplary scenario the plural bandwidth parts are located in different parts of the carrier frequency.

Accordingly, when a mobile terminal is triggered to perform handover from the source cell to the target cell, it receives radio resources from a different part of the carrier bandwidth. This is beneficial for the load balancing purpose in the target cell.

However, the adaptation of the reception operation in a mobile terminal includes (re-)tuning to a different center frequency where the respective bandwidth part is located and adjusting the filtering bandwidth to the corresponding (band-) width of the Referring to FIG. 2B, another exemplary scenario is shown where a mobile terminal is (again) configured with plural bandwidth parts in the source and target cell, e.g., before and after handover.

Now, in the source cell as well as in the target cell the first and second bandwidth parts are no longer configured in central alignment (in frequency domain) with one or another SS block, but instead they are more flexibly distributed over in the carrier bandwidth. Importantly, the mobile terminal is configured with a first bandwidth part in the source cell and in the target cell which are at a same location and have a same (band-) width (e.g., in number of physical resource blocks, PRBs).

Accordingly, when the mobile terminal is triggered to perform handover from the first bandwidth part (BWP #0) in the source cell to the first bandwidth part (BWP #0) in the target cell, it does not have to receive radio resources from a different part of the carrier bandwidth. Instead, the reception operation in the mobile terminal can stay the same.

This other exemplary scenario does not require the (re-)tuning and the filter adaptation to be carried out, such that the interruption of ongoing traffic due to frequency retuning during handover is avoided.

It shall however not go without saying that in this other exemplary scenario the mobile terminal is configured with second bandwidth parts (BWP #1) in the source cell and in the target cell which are not centrally aligned (in frequency domain) with the respective first bandwidth parts (BWP #0). When changing between the different bandwidth parts, the mobile terminal receives radio resources from a different parts of the carrier bandwidth.

In other words, changing between the first and the second bandwidth part within each of the source and target cell will require both the (re-)tuning and the filter adaptation to be carried out, such that the change is delayed (increasing latency). This may however be compensated with the increased bandwidth the mobile terminal can utilize in the second bandwidth part (BWP #1) of the source and target cell.

In summary, two different exemplary scenarios are discussed where the later (shown in FIG. 2b) has the advantage that it permits seamless handovers at least between the first bandwidth parts in the source cell and the target cell and the former can achieve the load balancing (shown in FIG. 2a).

These considerations are not restricted to downlink bandwidth parts but also apply to the uplink bandwidth parts in a source cell or a target cell. Also for uplink bandwidth parts the location and width is decisive for the transmission operation in the mobile terminal. The mobile terminal may be required to carry out uplink transmission on different frequency resources which usually also requires (re-)tuning and the filter adaptation.

Thus, the above discussed advantages/disadvantages equally apply for downlink bandwidth parts as well as uplink bandwidth parts.

Figure 3:
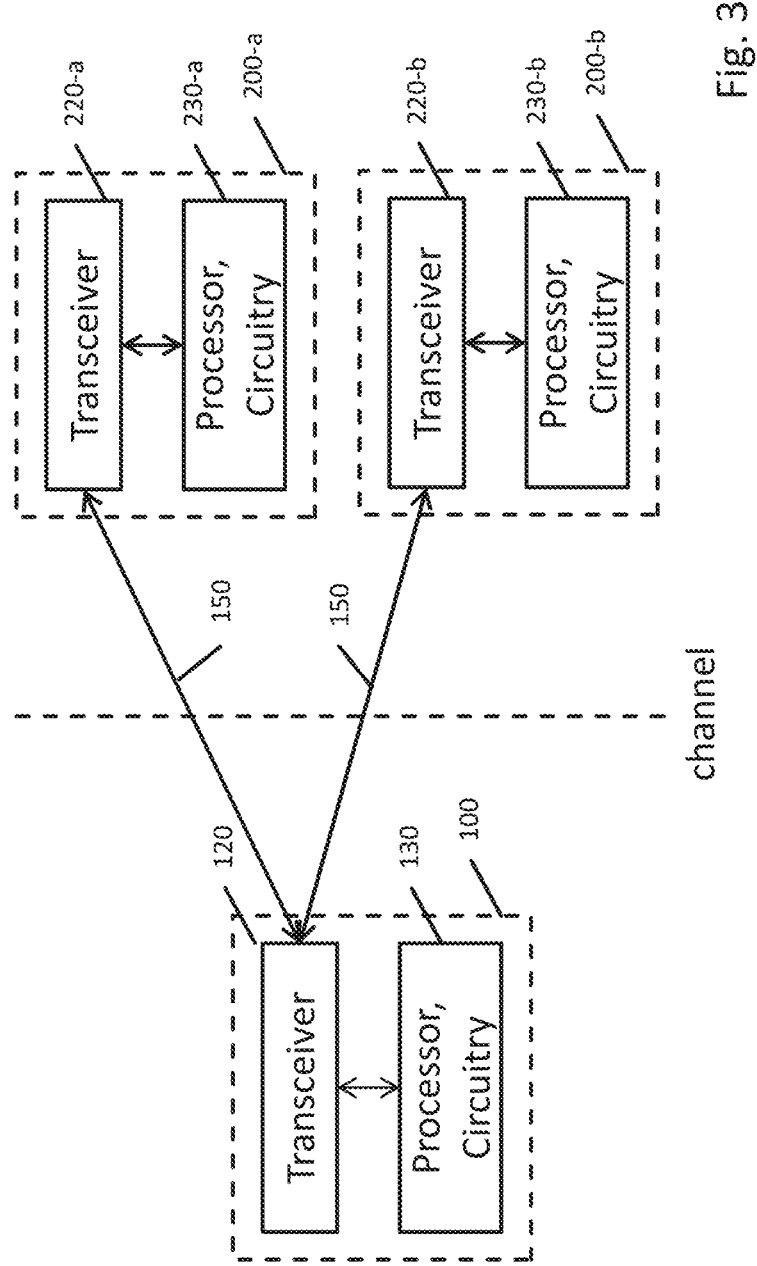
FIG. 3 is a block diagram showing the structure of a mobile terminal, a source and a target base station.

FIG. 3 illustrates a block diagram of mobile communication system including a mobile terminal 100 (also referred to as user equipment, UE), a source base station 200-*a* (also referred to as source g Node B, gNB) and a target base station 200-*b* (also referred to as target g Node B, gNB). This block diagram serves the purpose of showing the mobile terminal in a situation where it performs a handover from the source base station 200-*a* to the target base station 200-*b*.

In general, there exist multiple events that can cause a source base station 200-*a* to trigger the handover of the mobile terminal 100. For example, the source base station 200-*a* may trigger the handover due to an inferior coverage situation of the mobile terminal 100. The coverage is measured by the mobile terminal 100 in form of measurements and (subsequently) reported to the source base station 200-*a*. Alternatively, the source base station 200-*a* may also trigger handover of a mobile terminal 100, due to load balancing reasons in the source base station 200-*a*.

Regardless of what the cause may be, a processor 230-*a* of the source base station 200-*a* triggers handover to a target base station 200-*b* by causing its transceiver 220-*a* to transmit a handover request message (see message 1 in FIG. 1) to the target base station 200-*b*.

This and other messages may be sent over a wireless or wired interface connecting the base stations with each other. For example, the handover request message may be transmitted over the Xn interface which is defined as part of the Next Generation, NG, Radio Access Network, RAN, or over the Next Generation, NG, interface via the entity providing the Access and Mobility Management Function, AMF, and/or the User Plane Function, UPF. If the handover involves different 5G core networks, it may even be necessary to forward same message between different AMF/PDF entities.

A transceiver 220-*b* of the target base station 200-*b* receives from the source base station 200-*a* the handover request message. Particular, this message includes (among others) information regarding the capability of the mobile terminal 100 to communicate over at least two different bandwidth parts, e.g., a first bandwidth part BWP #0 and a second bandwidth part BWP #1 in the uplink and downlink. This information assists the target base station 200-*b* in deciding how many bandwidth parts it is expected to configured for the mobile terminal 100.

Assuming for the sake of example that the mobile terminal 100 is only capable of communicating over a single and not plural bandwidth parts, then the target base station 200-*b* will refrain from configuring more than one bandwidth part for the mobile terminal 100. Despite this possibility, the present disclosure focuses on mobile terminals 100 which are capable of communicating over plural bandwidth parts, thus promoting the target base station 200-*b* to configure all of the plural bandwidth parts for the mobile terminal.

The above restriction on bandwidth part capabilities may be understood as equally applying to the uplink and downlink in frequency division duplex, FDD, operation mode, as well as to the uplink and downlink in time division duplex, TDD, operation mode.

In other words, if a mobile terminal is said to be capable of communicating over a single bandwidth part in the FDD operation mode, then this may be understood as implying a configuration with at most a single bandwidth part in the downlink and a separate single bandwidth part in the uplink. If a mobile terminal is said to be capable of communication over a single bandwidth part in the TDD operation mode, then this may be understood as implying a joint configuration with (also) at most a single bandwidth part in the downlink and a single bandwidth part in the uplink (as a pair).

For this reasons, the present disclosure is laid out to refer to term "bandwidth parts", knowing that reference could equally be made to the term "uplink and downlink bandwidth parts" or even "uplink and downlink bandwidth part pairs". Both cases merely emphasize, e.g., that a separate bandwidth part is necessarily configured in uplink and downlink. Accordingly, it is indispensable for FDD and TDD operation to configure a first or second uplink and downlink bandwidth part, at the same time.

When the target base station 200-*b* has received a handover request message indicating that the mobile terminal 100 is capable of communicating over at least two, e.g., a first and a second bandwidth part in uplink and downlink, then the processor 230-*b* controls the transceiver 220-*b* to configure for the mobile terminal both of the at least first bandwidth part and the second bandwidth part.

Also the processor 230-*b* in the target base station 200-*b* controls the transceiver 220-*b* to transmit a handover (request) acknowledge message (see message 2 in FIG. 1) to the source base station 200-*a* including information regarding both, the configured at least first and second bandwidth parts in uplink and in downlink.

For example, this information includes for each of the bandwidth parts in uplink and downlink a location (e.g., center frequency), a bandwidth (e.g., number of physical resource blocks, PRBs), a numerology indicating the subcarrier spacing and cyclic prefix, and an index associated with this bandwidth.

Alternatively to the location, the information may also include an offset which indirectly identifies the location of an uplink bandwidth part by specifying the offset from a (given) location of a downlink bandwidth part, or the offset from a known reference location, e.g., the first PRB of the DL carrier bandwidth. It may be mentioned that some parameters for the bandwidth part configuration, e.g., the location and the bandwidth, can be encoded together to become a single parameter in the configuration.

Again, this handover request acknowledge message may be sent via Xn interface connecting the base stations directly with each other or NG interface connecting base station to core network.

The source base station 200-*a* then forwards the information from this handover (request) acknowledge message to the mobile terminal 100. This information is conveyed in form of a handover command message (see message 3 in FIG. 1). In other words, at least the information regarding the at least first bandwidth part and second bandwidth part configured in the target base station 200-*b* is (also) included in the handover command message to the mobile terminal 100.

A transceiver 120 of the mobile terminal 100 receives the handover command message from the source base station 200-*a* which includes among others the (above mentioned) information regarding the configured bandwidth parts. When receiving this handover command message, the processor 130 can process the included information in the present disclosure in two different mechanisms, which are discussed in the following as first embodiment and second embodiment.

Separate from the details, it is important to understand that in both embodiments the processor 130 of the mobile terminal 100 succeeds in activating one of the bandwidth parts which have been configured (specifically) for this mobile terminal 100 and with this configured bandwidth parts can already perform handover. Hence, the mobile communication system is not limited to perform handover with a common configuration of bandwidth parts which are, for example, broadcasted to all mobile terminals via system information messages. With the method disclosed, the congestion in the common configured bandwidth part may be avoided.

In the first embodiment, the mobile terminal 100 processes the information in the handover command in such a manner that the processor 130 activates in the transceiver 120 at least one pre-selected of the configured at least first and second bandwidth part in the uplink and downlink. For example, the mobile terminal 100 activates (exactly) one pre-selected bandwidth part in the uplink and one pre-selected bandwidth part in the downlink. However, this shall not be understood as a limitation in any respect. Rather, the mobile terminal 100 may also activate more than one pre-selected bandwidth part in the uplink and downlink. In future, to support simultaneous multi-numerology processing, it may be beneficial for a mobile terminal to activate, in the uplink and downlink carrier bandwidth, two bandwidth parts with different numerologies at a same time. Thus, it can be said that the mobile terminal 100 activates at least a pre-selected one of the configured bandwidth parts.

In the context of the present disclosure, the term "pre-selected" shall be understood as emphasizing that the selection is not performed by the mobile terminal itself. The selection can be defined by the specifications as the bandwidth part with a specific index (e.g., index #0), or a special bandwidth part such as the initial bandwidth part or the default bandwidth part, the selection is done by the target base station and then indicated to the mobile terminal.

Having activated the at least one pre-selected bandwidth part, the processor 130 of the mobile terminal 100 controls the transceiver 120 to perform over the activated at least one pre-selected bandwidth part communication with the target base station 200-*b* as part of the handover.

Since the target base station 200-*b* equally knows which one of the configured at least two bandwidth parts is the pre-selected one the mobile terminal will activate, it can also proceed with activating, after having transmitted the handover (request) acknowledge message, the same pre-selected at least one bandwidth part, the mobile terminal is expected to activate.

In the first embodiment, the mobile terminal 100 is provided with information regarding the configured at least two bandwidth parts. This information is signaled to the mobile terminal 100 even though (only) one of the at least two bandwidth parts is already pre-selected. Despite the (added) payload to the handover command, this information advantageously increases the flexibility at handover, namely permitting (already) at handover the switching between the configured at least two bandwidth parts.

Conversely, in the second embodiment, the mobile terminal 100 processes the information in the handover command in such a manner that the processor 130 first (actively) selects and then activates in the transceiver 130 at least one of the at least two configured bandwidth parts in the uplink and downlink. For example, also here the mobile terminal 100 selects and activates (exactly) one of the at least two bandwidth parts.

Again, this should not be understood as a limitation in any respect. Rather the mobile terminal 100 may also select and activate more than one of the at least two configured bandwidth parts in the uplink and downlink. This may yet again serves the purpose of processing multiple numerologies simultaneously or mitigating congestion among the available radio resource, for example, when selecting and activating two non-contiguous bandwidth parts with different numerologies at a same time.

Having selected and activated the at least one of the at least two configured bandwidth parts in the uplink and downlink, the processor 130 of the mobile terminal 100 controls the transceiver 120 to perform over the selected and activated bandwidth parts communication with the target base station 200-b as part of the handover.

Here, the target base station 200-b does not know (exactly) which of the configured at least two bandwidth parts is being selected and activated by the mobile terminal 100. Nevertheless, as both the at least two bandwidth parts are configured (specifically) for the mobile terminal to be selected and activated, it can proceed with activating all of the configured at least two bandwidth parts and resolve this uncertainty at the very initial phase to communicate with the mobile terminal.

Then at a later stage, as will be detailed next, the mobile terminal can notify the selection of the first activated bandwidth to the target base station by the method of RACH resource or PUSCH resource differentiation.

As a result, the target base station 200-b may detect from the further communication with the mobile terminal 100 which one of the configured bandwidth parts is actually used for communication. Thereby, it can obtain (retroactively) the information which one of the configured bandwidth parts the mobile terminal has selected and activated.

Also here it is important to recognize that, in the second embodiment, the mobile terminal 100 is provided with information regarding the configured at least two bandwidth parts. This information is signaled (together with other information detailed later) to the mobile terminal 100 to enable the mobile terminal to make the selection and then indicate the selection to the target base station.

Despite the (added) payload to the handover command, this information advantageously increases the flexibility at handover, namely permitting (already) at handover the switching between the configured at least two bandwidth parts.

Figure 4:
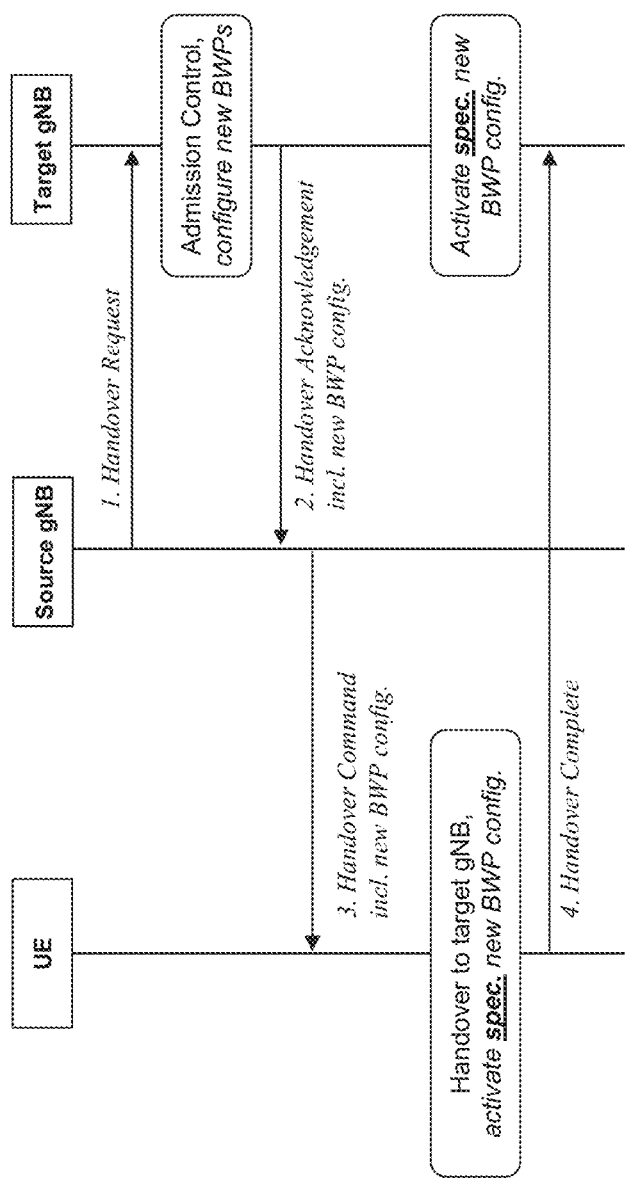
FIG. 4 depicts a sequence diagram of a handover procedure according to an exemplary implementation of the first embodiment in a 3GPP NR deployment scenario.

FIG. 4 depicts a sequence diagram of a handover procedure according to an exemplary implementation of the first embodiment in a 3GPP NR deployment scenario. In particular, a user equipment, UE, is shown when performing a handover from a source g Node B, gNB, to a target gNB.

In preparation of the handover, the source gNB transmits a handover request message (see message 1 in FIG. 4) to the target gNB. The handover request message is usually transmitted over the Xn interface establishing communication between gNBs in the next generation, NG, radio access network, RAN. This handover request message provides sufficient details for the target gNB to prepare for the handover of the UE, e.g., perform admission control.

Via this handover request message, the target gNB receives information regarding the capability of the UE to communicate over at least two bandwidth parts in uplink and downlink. This enables the target gNB to configure an appropriate number of bandwidth parts for the UE, e.g., that meet the capability of the UE. For example, if the UE is capable of communicating over two, a narrow and a wide bandwidth part, the target gNB does well in configuring also two bandwidth parts for the UE.

Having configured the appropriate number of bandwidth parts in the uplink and downlink, the target gNB includes information thereon in the handover (request) acknowledge message (see message 2 in FIG. 4). This message is transmitted from the target gNB to the source gNB. The handover (request) acknowledge message is usually also transmitted over the Xn interface if such interface between gNBs is available.

Successively, the source gNB relays the information in a handover command message (see message 3 in FIG. 4) to the UE. Thus, the information regarding the configured bandwidth parts in appropriate number is received by the UE. As discussed with regard to 3GPP NR, the handover command message includes numerous details for the UE to perform handover to the target gNB.

Importantly, with the information on the (appropriate number of) configured bandwidth parts, the UE is put in a situation where it can perform a handover to the target gNB utilizing bandwidth parts which have been configured in a UE-specific manner for the UE. In other words, the UE is not restricted to performing handover on a (common) initial bandwidth part which is shared among numerous UEs at a time.

Thus, the information on configured bandwidth parts alleviates congestion effects during handover, while at the same time this information dispenses with the necessity of configuring bandwidth parts at a later point in time. These advantages are achieved irrespective of the fixed handover sequence with the limited number of messages exchanged.

Advantageously, the UE with the target gNB can already perform the random access message transmissions, in a random access channel, RACH, based handover, over the UE-specifically configured bandwidth parts without necessity to rely on the (common) initial bandwidth part only.

Specifically, with the UE-specifically configured bandwidth parts, there is less congestion for the RACH message 1, and the RACH message 2 can be more flexibly scheduled.

The UE concludes the handover by transmitting a handover complete message (see message 4—FIG. 4) to the target gNB.

Having elaborated on the different configurations of bandwidth parts for an UE, the discussion has so far been silent about which of plural bandwidth parts is activated. This is an important point to mention as the UE and also the target gNB (most likely) will not activate all the configured bandwidth parts in uplink and one in downlink, because activating more bandwidth increases the power consumption and the processing complexity as well This is the reason in Release-15, it has been agreed that NR mobile terminal activates a single downlink bandwidth part and a single uplink bandwidth part at any given time.

Therefore, during handover the UE and the target gNB will activate only one of the configured bandwidth parts in the uplink and one in the downlink. Thus, it is necessary to establish a common understanding between the target gNB and UE which one of the two configured bandwidth parts in both the uplink and downlink is to be activated.

In this exemplary implementation, it is assumed that from among the information regarding the configured bandwidth parts, there is (always) one pre-selected bandwidth part in the uplink and downlink which is activated.

For example, assuming the information regarding the configured bandwidth parts have a specific sequence, then the UE as well as the target gNB can (always) activate the first or the last bandwidth part in the specific sequence. If there are more than two configured bandwidth parts in the sequence, then the UE as well as the target gNB can also (always) activate another one, say second, third, . . . , in the specific sequence.

As another example, the pre-selected bandwidth part can be some special bandwidth part, e.g., the initial BWP or the default BWP. By providing new configurations in the target gNB of such special BWP, the load balancing in the target cell can also be adapted.

In summary, the mere fact that the information regarding the configured bandwidth parts is provided in a specific sequence suffices to establish a common understanding between the UE and target gNB which one from this sequence is to be activated.

For this, it is however necessary that the sequence in the information regarding the configured bandwidth parts is the same in the handover (request) acknowledge message as well as in the handover command. In other words, the source gNB relaying this information preserves the sequence of the information when generating from the handover (request) acknowledge message the handover command.

In an exemplary extension of this implementation, the handover (request) acknowledge message as well as the handover command also include random access transmission parameters, such as a preamble sequence or a time and frequency resource to be used during the RACH based handover.

Importantly, the included random access transmission parameters need to be associated with at least the pre-selected one of the configured bandwidth parts. Thus, the UE performs a random access message transmission (e.g., RACH message 1) using the random access transmission parameters (specifically) associated with the pre-selected bandwidth part to be activated.

Due to the freedom in defining the random access transmission parameters only in association with the pre-selected one of the configured bandwidth parts, the utilization of the RACH resources can be improved. In such case, target gNB does not need to reserve the RACH resources corresponding to the other configured bandwidth parts than the pre-selected one for the UE performing handover. As a result, more free RACH resources become available for other UEs in the target cell.

In a further exemplary extension of this implementation, the handover request message additionally includes information regarding the state of the activated bandwidth part in the source gNB. Alternatively or in addition, the handover request message includes information regarding data traffic information predicted by the source gNB, e.g., data traffic to be expected after handover.

For example, the state of the activated bandwidth part may include a descriptor, e.g., to narrow- or wideband, or include a reference to the (band-) width (e.g., in physical resource blocks) of the bandwidth part activated in the source gNB before handover. Also for example, the traffic information predicted by the source gNB may include an index to buffer size levels of buffer statuses in the downlink or include information from buffer status reports from the UE in the uplink before handover.

In both cases, when the source gNB forwarding this information in the handover request message to the target gNB, the target gNB can (actively) select which one of the configured bandwidth parts is best suited to become the pre-selected one of the configured bandwidth parts.

For example, if UE traffic demand is low or none, it may be better to activate the narrower bandwidth part during and after the handover, to make sure that UE power is not wasted. On the other hand, if UE traffic demand is high, it would be a wise decision to activate a wider bandwidth part among the configured ones even during the handover.

Then after handover, UE data can be served immediately with wider bandwidth part (with full capacity) without the need of an additional bandwidth part switching (and hence avoid the delay introduced by bandwidth part switching).

One can argue that during handover there is only a small amount of traffic to communicate between UE and the target base station, e.g., to perform random access. Therefore, during handover, UE can operate in narrower bandwidth part. Then after random access is completed, target gNB can indicate UE to switch to wide BWP if necessary by DCI. However, the following drawbacks are observed:

Although BWP switching transition time is still under discussion, it is likely at least one slot (of 15 kHz SCS) is needed. Therefore, if BWP switching DCI is transmitted in slot n and then UE performs BWP switching in slot n+1 (since BWP switching DCI with null data scheduling is not supported UE still needs to receive PDSCH in narrow BWP in slot n), the first opportunity to schedule UE data in wide BWP is slot n+2. If UE traffic demand is high, the latency for data delivery is compromised.

Furthermore, the channel state information (CSI) is also delayed. Since CSI is measured within the active BWP, CSI for wide BWP is not available until wide BWP is activated. Therefore, in the above example where wide BWP is activated in slot n+2, gNB has to use conservative scheduling decision for at least slot n+2 (and possibly also slot n+3 if the UE is not able to feedback CSI in the same slot), resulting in further latency.

There is a risk that DCI for BWP switching is missed by the UE. Although this is related to general DCI error case, it is more reasonable to avoid the unnecessary BWP switching by setting the BWP consistently during and after handover.

For conveying this selection of the pre-selected bandwidth part to the UE, the target gNB then (re-)arranges the information regarding the configured bandwidth parts in the specific sequence. For example, the target gNB can (re-)arrange the best suited one of the configured bandwidth parts to be the first or the last of the configured bandwidth parts in the specific sequence included in the handover (request) acknowledge message. Then, when the UE is expected to activate, as the pre-selected bandwidth part, (always) the first or last of the specific sequence of bandwidth parts, it will (automatically) activate the best suited bandwidth part.

Figure 5:
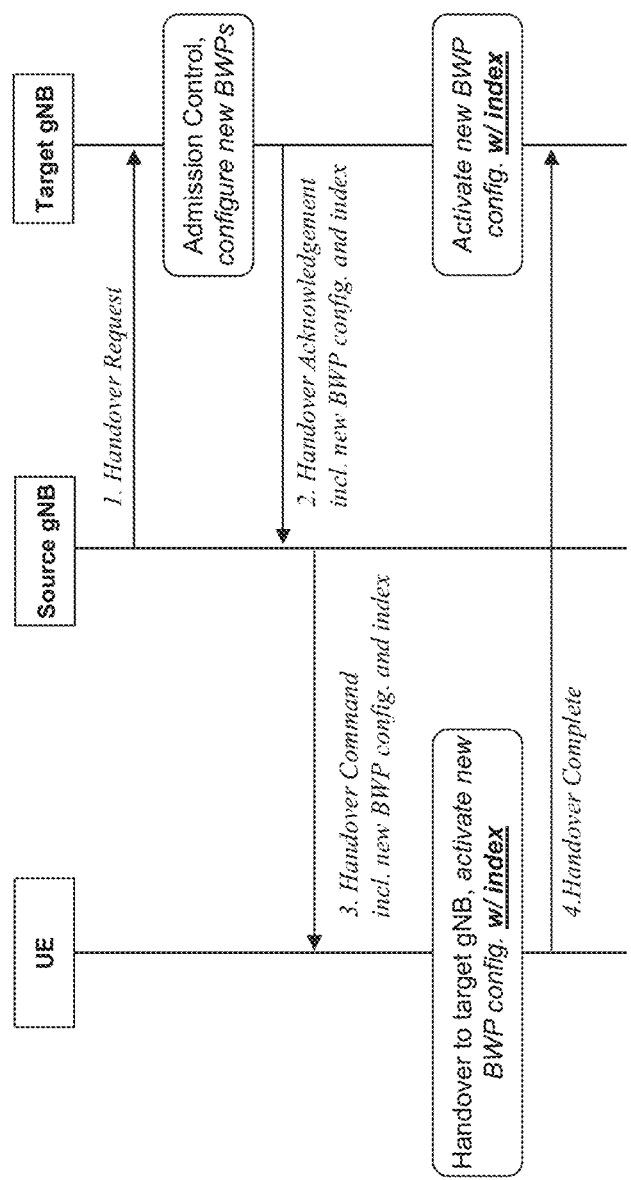
FIG. 5 illustrates a sequence diagram of a handover procedure according to a different exemplary implementation of the first embodiment in a 3GPP NR deployment scenario.

FIG. 5 illustrates a sequence diagram of a handover procedure according to a different exemplary implementation of the first embodiment in a 3GPP NR deployment scenario. As this different exemplary implementation is closely related to the previous described exemplary implementation shown in FIG. 4, the following discussion will focus on the differences only.

Similarly with before, also here the information on the (appropriate number of) configured bandwidth parts, puts the UE in a situation where it can perform a handover to the target gNB utilizing bandwidth parts which have been configured for the UE. Accordingly, same or similar advantages are realized.

Different from the above, there is an index (or bandwidth part index) additionally included in the handover (request) acknowledge message (see message 2—FIG. 5) from the target gNB to the source gNB and additionally included in the handover command message (see message 3—FIG. 5) from the source gNB to the UE. This index indicates which one of the configured bandwidth parts is to be activated in uplink and downlink.

For example, both messages may include an index, e.g., BWP #1, for the uplink and downlink, so as to unambiguously indicate which one from among the information regarding the configured bandwidth parts is to be activated. Thus, with the index the according bandwidth part to be activated can also be pre-selected by the target gNB.

Considering both messages include information regarding a configured first and second bandwidth part. Then, an index indicating the first or the second configured bandwidth part, regarding which information is transmitted, enables the UE to activate the accordingly pre-selected one of the two bandwidth parts.

Thereby, it is no longer necessary provide the information regarding the configured bandwidth parts in a specific sequence, but rather can the information be arranged in an increasing order, e.g., resulting in the narrow(est) bandwidth part first and the wide(r) bandwidth part thereafter.

Similarly to the further exemplary extension where the request message additionally includes information regarding the state of the activated bandwidth part in the source gNB, or regarding data traffic information predicted by the source gNB, e.g., data traffic to be expected after handover.

In both cases, when the source gNB forwarding this information in the handover request message to the target gNB, the target gNB can also here (actively) select which one of the configured bandwidth parts is best suited to become the pre-selected one of the configured bandwidth parts. For conveying this selection of the pre-selected bandwidth part to the UE, the target gNB then incorporates an according index to the information regarding the configured bandwidth parts in the message as discussed before.

Figure 6:
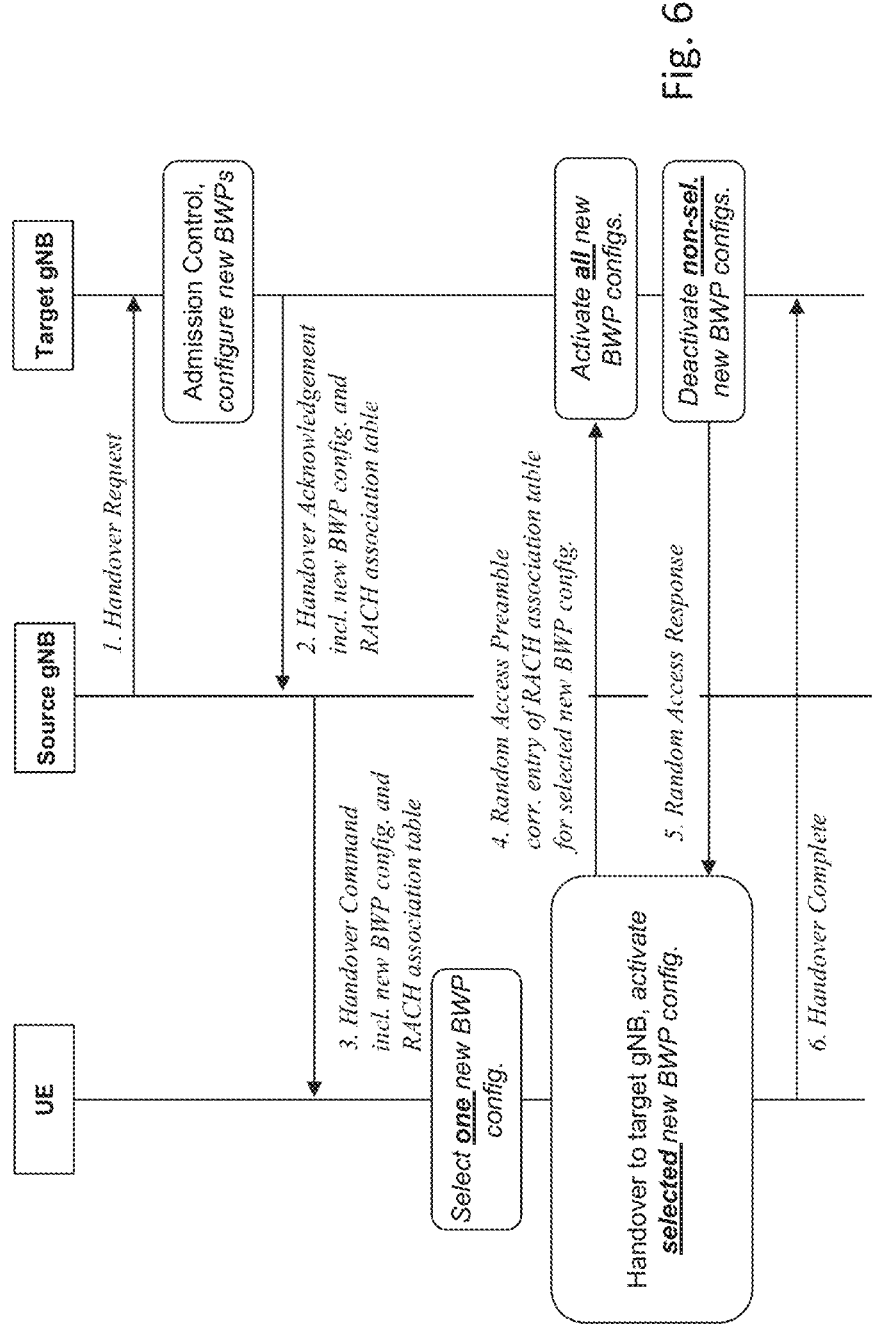
FIG. 6 depicts a sequence diagram of a handover procedure according to an exemplary implementation of the second embodiment in a 3GPP NR deployment scenario.

FIG. 6 depicts a sequence diagram of a handover procedure according to an exemplary implementation of the second embodiment in a 3GPP NR deployment scenario. In particular, a user equipment, UE, is shown when performing a handover from a source gNB, to a target gNB.

In preparation of the handover, the source gNB transmits a handover request message (see message 1 in FIG. 6) to the target gNB. The handover request message is again usually transmitted of the Xn interface establishing communication between gNBs in the next generation, NG, radio access network, RAN if such link is available otherwise the message will be sent via core network. This handover request message provides sufficient details for the target gNB to prepare for the handover of the UE, e.g., perform admission control.

Via this handover request message, the target gNB receives information regarding the capability of the UE to communicate over at least two bandwidth parts in uplink and downlink. This enables the target gNB to configure an appropriate number of bandwidth parts for the UE, e.g., that meet the capabilities of the UE. For example, if the UE is capable of communicating over two, a narrow and a wide bandwidth part, the target gNB does well in configuring also two bandwidth parts for the UE.

Having configured the appropriate number of bandwidth parts in the uplink and downlink, the target gNB includes information thereon in the handover (request) acknowledge message (see message 2 in FIG. 6). This message is transmitted from the target gNB to the source gNB. The handover (request) acknowledge message is usually also transmitted over the Xn interface if possible.

Different from the above, the target gNB also includes in the handover (request) acknowledge message an association table which associates each of the configured two bandwidth parts with different random access transmission parameters.

An example of such an association table is shown in FIG. 7. This example assumes that at least two bandwidth parts are configured in the uplink and in the downlink, respectively identified UL BWP #0 and UL BWP #1 or DL BWP #0 and DL BWP #1. The possibility of having further configured bandwidth parts included is hinted at by the extra column with three dots.

From this table, it can be seen that each of the configured bandwidth parts in the uplink as well as in the downlink are associated with different transmission parameters.

For example, the configured UL BWP #0 is associated some random access transmission parameters, namely either RACH #0 or RACH #2, the further configured UL BWP #1 is associated with different random access transmission parameters, namely either RACH #1 or RACH #3. Equally, the configure DL BWP #0 and BWP #1 are also associated with different random access transmission parameters.

It shall not go without saying that each of the configured bandwidth parts in uplink as well as in the downlink are individually (as discussed before) associated with different random access parameters but are also in combination associated with different random access parameters.

In other words, here the combination of each of the configured bandwidth parts in the uplink and in the downlink is also associated with different random access transmission parameters. For example, the combination of DL BWP #0 and UL BWP #0 is associated with parameter RACH #0 whereas the different combination of DL BWP #0 and UL BWP #1 is associated with parameter RACH #1.

Despite being beneficial, this is, however, not necessary for achieving advantageous effects, as will become apparent from the following.

Successively, the source gNB relays the information in a handover command message (see message 3 in FIG. 6) to the UE. Thus, the information regarding the configured bandwidth parts in appropriate number is received by the UE. Similar to case described in FIG. 4, the information on configured bandwidth parts alleviates congestion effects on (common) initial bandwidth part during handover, while at the same time dispensing with the necessity of configuring bandwidth parts at a later point in time.

The source gNB also relays the association table in the handover command message to the UE. This association table enables the UE to perform a random access channel (RACH) based handover to the target gNB. Both contention-based and contention-free random access can perform, depending on whether contention-based or contention-free RACH resources that the target gNB decides to put in the association table.

The UE with the target gNB can perform the random access message transmissions, in the RACH-based handover, over the configured bandwidth parts without necessity to rely on the (common) initial bandwidth part only.

Specifically, with the configured bandwidth parts, there is less congestion for the RACH message 1 in the uplink, and the RACH message 2 can be more flexibly scheduled in the downlink.

The UE concludes the handover by transmitting a handover complete message (see message 6—FIG. 6) to the target gNB.

Having elaborated on the different configurations of bandwidth parts for an UE, it is also necessary to establish a common understanding between the target gNB and UE which one of the two configured bandwidth parts in both the uplink and downlink is to be activated.

In this exemplary implementation, it is assumed that the UE (actively) selects the configured bandwidth part to be activated. In other words, here the UE is put in a situation where it is not bound by any pre-selection carried out by the target gNB but it can (freely) select any of the configured bandwidth parts regarding which information is relayed from the target gNB.

Advantageously, the UE is generally the best to know about and to predict its own uplink traffic. Despite the fact that buffer status reports are signaled from the UE to the source gNB, this is not necessarily accounted for at the target gNB during handover. Furthermore, it can be outdated due to the time gap between the buffer status is reported and the handover command is received by the UE. Thus, with the UE (actively) selecting the configure bandwidth part to be activated, it can be ensured that—at least in the uplink—the activation suits best the UE's demands during and after the handover.

Having selected one of the configured bandwidth parts, the UE performs a RACH based handover by first activating the selected one bandwidth part and then performing a random access message transmission using the parameters associated with the selected and activated one bandwidth part.

The random access message transmission not only uses the associated parameters but also is carried out over the selected and activated bandwidth part. Thus, there is an unambiguous association between the parameters of the transmission and the bandwidth part over which the transmission is carried out. This provides the following advantages.

For example, assuming that a UE selects and activates the UL BWP #1, then the association table in FIG. 7 requires it to use the parameter RACH #1 or RACH #3. Either way, when the UE performs the random access message transmission with parameter RACH #1 or RACH #3 the target gNB can re-assure itself that the random access transmission was effected over the (correct) UL BWP #1.

This level of re-assurance is beneficial. The random access transmission does not occupy the complete uplink bandwidth part, thus, making it difficult for the target gNB to tell apart different uplink bandwidth parts, particularly where, for example, the two configured uplink bandwidth parts are centrally aligned with each other or are configure with a substantial overlap.

Accordingly, the association table prevents from situations in which the target gNB receives a random access message transmission, but cannot determine which uplink bandwidth part was used, and thus has been selected and activated by the UE.

Additionally, the parameters from the association table in FIG. 7 also convey information regarding the selected and activated downlink part. For example, when the UE performs the random access message transmission with the parameter RACH #1, then the target gNB knows not only that the UL BWP #1 but also the DL BWP #0 was selected.

Accordingly, the association table can assist the UE and gNB to arrive at a common understanding which of the configured bandwidth parts the UE has selected and activated in the uplink and in the downlink for use in communications (already) part of the handover procedure.

Referring now to the RACH based handover in further detail. On the basis of the information in the handover command, the UE selects and activates one of the configured bandwidth parts in the uplink and downlink. These bandwidth parts are used in the subsequent handover procedure.

The UE transmits a random access preamble message (see message 4—FIG. 6) to the target gNB with a preamble sequence and/or time and frequency resources from the association table corresponding to the selected and activated bandwidth.

This random access preamble message is received at the target gNB and responded to with a random access response message (see message 5—FIG. 6). This message is transmitted from the target gNB to the UE. The target gNB uses for transmission of this message the corresponding bandwidth part in the downlink.

When coming back to the example with random access transmission parameter being RACH #1, then the target gNB uses for the transmission of the random access response message the downlink bandwidth part DL BWP #0. Again it can be appreciated that the association table achieves a common understanding between the UE and the target gNB which one of the configure bandwidth parts are to be used during and after handover.

There may, however, be situations where this level of autonomy at the UE is undesired, or even disadvantageous.

In an exemplary extension of this implementation, thus, the handover (response) acknowledge includes a bandwidth part index which will be forwarded to UE in handover command which restricts the freedom for the UE to select the bandwidth parts. Accordingly, the UE receives information regarding configured bandwidth parts from among which it can, however, only select that one which correspond to the index. The restriction can also be imposed by the source gNB in the handover command. In such case, the bandwidth part index is determined by the source gNB.

A particular advantageous effect is attained when this index indexes a specific downlink bandwidth part to be used while, at the same time retains the freedom for the UE to (actively) select its uplink bandwidth part for handover. Then, the index indexes a subset of bandwidth part combinations, namely uplink bandwidth parts for that specific downlink bandwidth part which correspond to the bandwidth part index.

With such a definition of the bandwidth part index, the UE is restricted to select and activate bandwidth parts from a subset of all the configured bandwidth parts regarding which the information is included in the handover command. This subset includes all configured uplink bandwidth parts but none of the configured downlink bandwidth parts, as the downlink bandwidth part is pre-selected by the index.

The advantageous effect results from the observation that the UE is generally the best to know about and to predict its own uplink traffic, whereas the source gNB or target gNB can do its best to predict the downlink traffic. In other words, this index mediates between two extremes, namely one extreme where the target gNB pre-selects all bandwidth parts, and another extreme where the UE selects all bandwidth parts.

This exemplary extension of having the index results in further advantages when combined with the following modifications.

In a further exemplary extension of this implementation, the handover request message additionally includes information regarding the state of the activated bandwidth part in the source gNB. Alternatively or in addition the handover request message includes information regarding data traffic information predicted by the source gNB, e.g., data traffic to be expected after handover.

In both cases, when forwarding this information in the handover request message to the target gNB, it can (actively) select which one of the configured bandwidth parts is best suited to become the pre-selected downlink bandwidth part without restricting the UE's freedom to (actively) select an uplink bandwidth part from the configured bandwidth parts.

For conveying this selection of the pre-selected downlink bandwidth part to the UE, the target gNB includes a corresponding index (bandwidth part index) in the handover (request) acknowledge message, which is relayed by the source gNB in form of the handover command to the UE.

Then, when the UE is expected to select and activate the configured bandwidth parts, it restricted to do so from the subset of all the configured bandwidth parts regarding which the information is included in the handover command. Thereby, the UE cannot only (actively) select the best uplink bandwidth part but also receive guidance when selecting the best downlink bandwidth part.

It goes without saying that the association table permits the target gNB to gain the level of re-assurance regarding which one of the configured uplink bandwidth parts has been selected and activated by the UE.

In a different exemplary extension of this implementation, the bandwidth part index included in the handover (request) acknowledge message and the handover command indexes a single one bandwidth part in the uplink as well as in the downlink. Thereby, the UE is deprived of the freedom to select any one of the configured bandwidth part, neither in the downlink nor in the uplink.

Coming back to the more general discussion of the exemplary implementation, it must be mentioned that the target gNB does not know the UE selected one of the configured bandwidth parts in advance before UE makes the first contact with the target gNB by sending RACH message 1. In other words, the UE is given truly given the freedom to select and (at the same time) activate the (best suited) one of the configured bandwidth parts (at least for uplink).

As the random access transmission message (see message 4—FIG. 6) is already transmitted over the UE selected uplink bandwidth part, the target gNB has to make arrangements to receive this message regardless of what the outcome of the selection may be. This uncertainty brings the target gNB into a situation where it cannot foresee the uplink bandwidth part to be used.

For this reasons, the target gNB activates not only one but instead all of the configured bandwidth parts, e.g., all uplink bandwidth parts regarding which information was included in the handover (request) acknowledge and handover command message. In other words, different from the previous implementation, the target gNB must monitor not one but all configured uplink bandwidth parts.

Nevertheless, once the association table gives away which one of the configured bandwidth parts was selected, the uncertainty is removed from the target gNB and it can proceed with de-activating all non-selected bandwidth parts.

Coming back the example where the UE has selected RACH #1 for use with the random access preamble transmission (message 4—FIG. 6). Due to the uncertainty, the target gNB has to activate UL BWP #0 and UL BWP #1 which has (previously) configured and indicated in form of additional information to the UE. Only then does the target gNB ensure that it receives the message regardless of what the selection may be.

With the reception of this random access preamble transmission with RACH #1, the target gNB is provided with the knowledge on the outcome of the UE's selection, e.g., it knows that the UE has selected DL BWP #0 and UL BWP #1 as shown in FIG. 7. The, the target gNB can instantly proceed with deactivating the remaining of the configured but non-selected.

Figure 8:
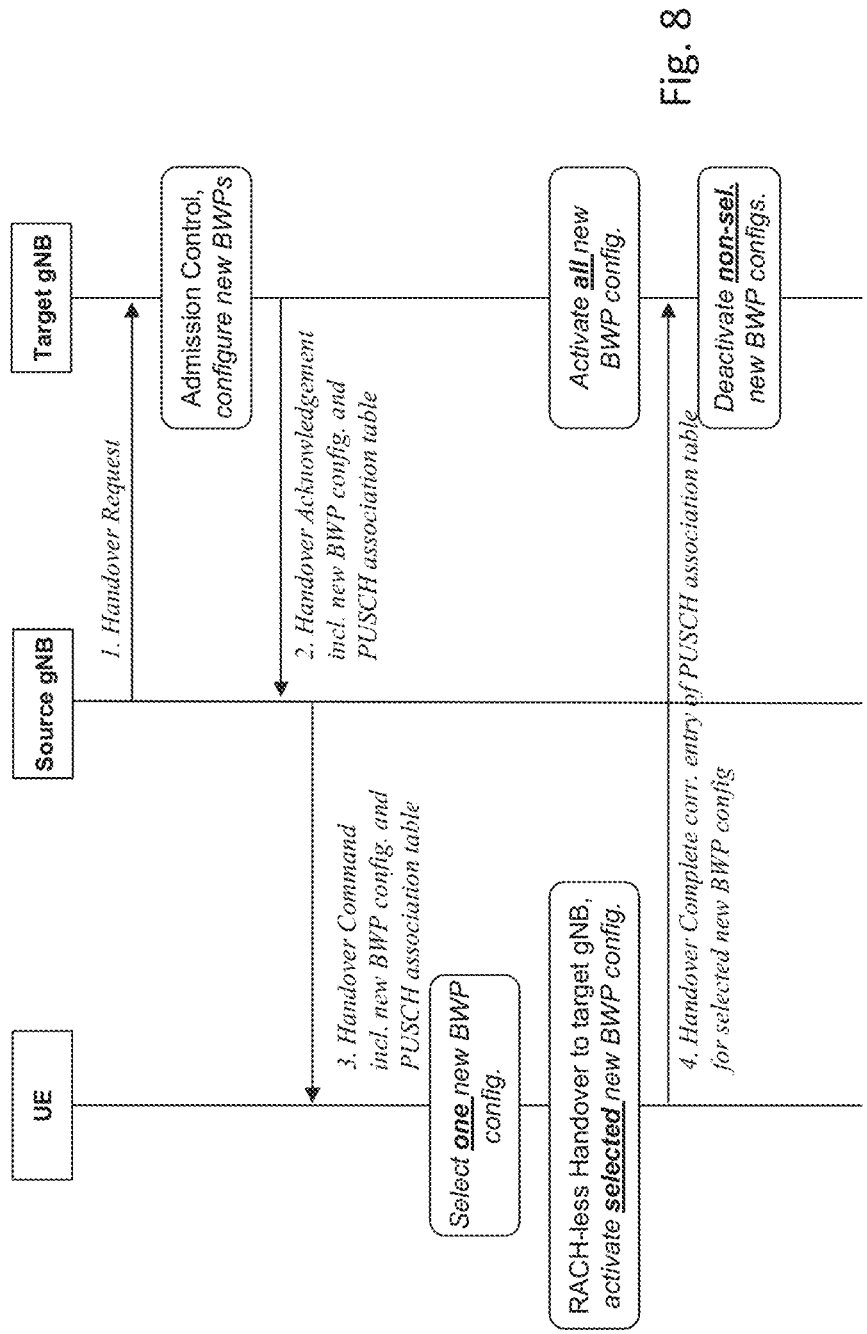
FIG. 8 illustrates a sequence diagram of a handover procedure according to a different exemplary implementation of the second embodiment in a 3GPP NR deployment scenario.

FIG. 8 illustrates a sequence diagram of a handover procedure according to a different exemplary implementation of the second embodiment in a 3GPP NR deployment scenario. As this different exemplary implementation is closely related to the previous described exemplary implementation shown in FIG. 6, the following discussion will focus on the differences only.

As starting point, this implementation is based on the understanding that handovers do not necessarily require RACH transmissions (termed RACH-based handover) but instead that handovers are also conceivable in a RACH-less fashion (termed: RACH-less handovers).

Such RACH-less handovers are, for example, envisioned in mobile communication systems where there is time synchronization between multiple gNB s or the time advance regarding the neighboring cell is already known to the UE performing handover (e.g., when the secondary cell (SCell) is changed to the primary cell (PCell)). In such cases, the UE is not required to perform random access procedure for re-establishing time synchronization when performing handover from a source to a target cell.

For example, the UE would with such a RACH-less handover re-use the same timing advance command when communicating with the source gNB or with the target gNB. There is simply not necessity to perform a random access transmission, e.g., random access preamble transmission, when there is no uncertainty in the timing in the target gNB.

With this understanding, it is immediately evident that an association table associating the configured bandwidth parts with different random access transmission parameters is useless. Rather, in this exemplary implementation there is an association table which associates the configured bandwidth parts with different uplink shared channel transmission parameters as shown in FIG. 9.

For example, the different uplink shared channel transmission parameters may include time and frequency of radio channel resources, which can be used by the UE when transmitting the handover complete message (see message 4—FIG. 8). In other words, the uplink shared channel transmission parameters could be considered as being uplink grants to different radio resources in the physical uplink shared channel of the target base station.

Aside of this fundamental difference, the handover procedure only differs with regard to the information included in the handover (request) acknowledge message (see message 2—FIG. 8) and included in the handover command message (see message 3—FIG. 8) transmitted from the target gNB via the source gNB to the UE.

These messages do not include an association table associating the configured bandwidth parts with different random access transmission parameters, but instead include an association table associating the configured bandwidth parts with different uplink shared channel transmission parameters.

With the different uplink shared channel transmission parameters, the target gNB also here gains a beneficial level of re-assurance. As the handover complete transmission does not occupy the complete uplink bandwidth part, the target gNB will have difficulties to tell apart the different uplink bandwidth parts, particularly where, for example, two configured uplink bandwidth parts are centrally aligned with each other, or are configured with substantial overlap.

Consequently, also here the association table advantageously prevents from situations in which the target gNB receives an uplink shared channel transmission, but cannot determine which uplink bandwidth part was used, and thus has been selected and activated by the UE. For the remaining details, reference is made to the above description of FIG. 6 which can be understood as describing the procedure as well as the advantages in analogous form.

It shall be mentioned that in case of carrier aggregation where multiple component carriers are configured for the UE, the bandwidth part configuration and activation method in this disclosure is for each component carrier. In other words, each component carrier has independent bandwidth part configurations. During handover, UE's PCell will be changed. However, UE SCell configurations can be either be released or still kept, depending on the handover acknowledge received by the UE. Similarly, the new bandwidth part configurations can be provided accordingly.

Referring now to the most general description, it can be summarized that the present disclosure provides for mechanisms which permit a coordinated configuration of bandwidth parts at handover, thereby minimizing interruption time and reducing the power consumption at handover. Figuratively speaking, if the utilization level of the target base station permits, the bandwidth parts can be configured same in source and target cell as discussed with regard to in FIG. 2B.

This is particularly so if the handover request message (see message 1—FIGS. 4, 5, 6, and 8) additionally includes information regarding at least a third and a different fourth bandwidth part which are configured in the source base station and/or information regarding the activated one of the configured at least third and fourth bandwidth part in the source base station.

Then the target base station can configuring for the mobile terminal the first bandwidth part and the second bandwidth part in the transceiver based on the third bandwidth part and fourth bandwidth part, respectively. More specifically, the target base station can configure the first bandwidth part same (or similar) as the third bandwidth part and the second bandwidth part same (or similar) as the fourth bandwidth part.

Thus, a coordinated configuration of the bandwidth parts is achieved at handover realizing the numerous advantages discussed above.

Finally, when having the information regarding the most recently activated bandwidth part in the source base station readily available in the target base station, then this target base station can not only coordinately configure the bandwidth parts for the mobile terminal, but it can also transmit the handover request acknowledge message including a bandwidth part index, where the bandwidth part index indexes that bandwidth part which is the same as the previously activated one of the configured bandwidth part in the source base station.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is suggested for performing a handover procedure in a mobile communication system from a source base station to a target base station. The target base station is configured for the mobile terminal with at least a first bandwidth part and a different second bandwidth part within its cell bandwidth. The mobile terminal comprises: a transceiver which, in operation, receives from the source base station a handover command message including information regarding the configured at least first bandwidth part and second bandwidth part; and a processor which, in operation and upon reception of the handover command message, activates in the transceiver at least a pre-selected one of the configured at least first bandwidth part or second bandwidth part, and controls the transceiver to perform, over the activated at least one of the configured at least first bandwidth part or second bandwidth part, communication with the target base station as part of the handover procedure.

According to a second aspect, which can be combined with the first aspect, the information regarding the configured at least first bandwidth part and second bandwidth part has a specific sequence, and the processor, in operation, activates, as the pre-selected one of the bandwidth parts, the first or last or a specific other one, if more than the at least first bandwidth part and the second bandwidth part are configured, in the specific sequence.

According to a third aspect, which can be combined with the first aspect, the received handover command message additionally includes a bandwidth part index, and the processor activates the pre-selected one of the configured at least first bandwidth part or the second bandwidth part which corresponds to the bandwidth part index.

According to a fourth aspect, which can be combined with the first to third aspect, the processor controls the transceiver to perform at least a random access message transmission to the target base station as part of the handover procedure.

According to a fifth aspect, which can be combined with the first to fourth aspect, in case the received handover command message additionally includes a plurality of different random access transmission parameters associated with at least the pre-selected one of the configured at least first bandwidth part and second bandwidth part, the processor controls the transceiver to perform at least a random access message transmission to the target base station using the random access transmission parameters associated to the activated pre-selected one of the configured at least first bandwidth part or the second bandwidth part.

According to a sixth aspect, a mobile terminal is proposed for performing a handover procedure in a mobile communication system from a source base station to a target base station. The target base station is configured for the mobile terminal with at least a first bandwidth part and a different second bandwidth part within its cell bandwidth. The mobile terminal comprises: a transceiver which, in operation, receives from the source base station a handover command message including information regarding the configured at least first bandwidth part and second bandwidth part; and a processor which, in operation and upon reception of the handover command message, selects and activates in the transceiver at least one of the configured at least first bandwidth part or the second bandwidth part, and controls the transceiver to perform, over the selected and activated at least one of the configured at least first bandwidth part or the second bandwidth part, communication with the target base station as part of the handover procedure.

According to a seventh aspect, which can be combined with the sixth aspect, the received handover command message additionally includes a bandwidth part index, and the processor, in operation, selects and activates, in the transceiver, one of a subset of the configured at least first bandwidth part or the second bandwidth part which corresponds to the bandwidth part index.

According to an eight aspect, which can be combined with the sixth aspect, the bandwidth part index indexes a subset of uplink bandwidth parts for a specific downlink bandwidth part, and the processor, in operation, selects and activates, in the transceiver, the subset of the configured at least first bandwidth part or the second bandwidth part which corresponds to the bandwidth part index.

According to a ninth aspect, which can be combined with the sixth to eight aspect, the received handover command message additionally includes: a plurality of different random access transmission parameters associated with each or a subset of the configured at least first bandwidth part and second bandwidth part; and the processor, in operation, controls the transceiver to perform at least a random access message transmission using the random access transmission parameters associated to the selected and activated one of the configured at least first bandwidth part or the second bandwidth part.

According to the tenth aspect, which can be combined with the ninth aspect, the plurality of random access transmission parameters comprise at least one or more of:—a random access preamble sequence, transmitted with the random access message, and—time and frequency of radio channel resources, to be used by the mobile terminal when transmitting the random access message to the target base station.

According to an eleventh aspect, a target base station is suggested for performing a handover procedure of a mobile terminal in a mobile communication system from a source base station. The target base station is capable of communicating with the mobile terminal over each of at least a first bandwidth part and a different second bandwidth part within its cell bandwidth. The target base station comprises: a transceiver which, in operation, receives from the source base station a handover request message including information regarding the capability of the mobile terminal to communicate over at least the first bandwidth part and second bandwidth part; and a processor which, in operation and upon reception of the handover request message, controls the transceiver to configure for the mobile terminal at least the first bandwidth part and the second bandwidth part, and controls the transceiver to transmits to the source base station a handover request acknowledge message, wherein the handover request acknowledge message includes information regarding the configured at least first bandwidth part and second bandwidth part.

According to a twelfth aspect, which can be combined with the eleventh aspect, the processor, in operation and after controlling the transmitter to transmit the handover request acknowledge message, activates in the transmitter the same pre-selected one of the configured at least first bandwidth part or second bandwidth part which the mobile terminal is expected to activate.

According to a thirteenth aspect, which can be combined with the twelfth aspect, the information regarding the configured at least first bandwidth part and second bandwidth part has a specific sequence, and the processor, in operation, activates, as the pre-selected one of the bandwidth parts, the first or last or a specific other one, if more than the at least first bandwidth part and the second bandwidth part are configured, in the specific sequence.

According to a fourteenth aspect, which can be combined with the twelfth aspect, the handover request acknowledge message additionally includes a bandwidth part index, and the processor, in operation, activates the pre-selected one of the configured at least first bandwidth part or the second bandwidth part which corresponds to the bandwidth part index.

According to a fifteenth aspect, which can be combined with the eleventh to fourteenth aspect, the handover request message additionally includes information regarding the state of the activated bandwidth part or predicted traffic information; and the processer, in operation and upon reception of the handover request message, controls the transceiver to select and activate at least one the at least the first bandwidth part and the second bandwidth part which the mobile terminal, as part of the handover procedure, is expected to activate as the pre-selected bandwidth part.

According to a sixteenth aspect, which can be combined with the eleventh aspect, the processor, in operation and after controlling the transmitter to transmit the handover request acknowledge message, activates in the transceiver all of the configured at least first bandwidth part or second bandwidth part.

According to an seventeenth aspect, which can be combined with the eleventh aspect, the handover request acknowledge message additionally includes:—a plurality of different uplink shared channel transmission parameters, each associated with a different one of the configured at least first bandwidth part and second bandwidth part; and the processor, in operation, controls the transceiver to schedule candidates of handover complete message transmission using all of the plurality of uplink shared channel transmission parameters which are associated with the configured at least first bandwidth part or the second bandwidth part.

According to an eighteenth aspect, which can be combined with the seventeenth aspect, the plurality of uplink shared channel transmission parameters comprise—time and frequency of radio channel resources, to be used by the mobile terminal when transmitting the handover complete message to the target base station.

According to a nineteenth aspect, which can be combined with the seventeenth or eighteenth aspect, in case the handover request acknowledge message additionally includes a plurality of uplink shared channel transmission parameters, each associated with a different one of the configured at least first bandwidth part and second bandwidth part, the transceiver, in operation, additionally receives from the mobile terminal a handover complete message transmission using one of the plurality of uplink shared channel transmission parameters which is associated to the by the mobile terminal selected and activated of the configured at least first bandwidth part or the second bandwidth part; and the processor, in operation, deactivates the remaining of the configured at least first bandwidth part and second bandwidth part which the mobile terminal has not selected and activated.

According to a twentieth aspect, which can be combined with the eleventh aspect, the handover request acknowledge message additionally includes:—a plurality of different random access transmission parameters each associated with a different one of the configured at least first bandwidth part and second bandwidth part; and the processor controls the transceiver to reserve random access message transmissions using all of the plurality of random access transmission parameters which are associated to the configured at least first bandwidth part or the second bandwidth part.

According to a twenty-first aspect, which can be combined with the twentieth aspect, the plurality of random access transmission parameters comprise at least one or more of:—a random access preamble sequence, transmitted with the random access message,—time and frequency of radio channel resources, to be used by the mobile terminal when transmitting the random access message to the target base station.

According to a twenty-second aspect, which can be combined with the twenty-first aspect, in case the handover request acknowledge message additionally includes a plurality of different random access transmission parameters each associated with a different one of the configured at least first bandwidth part and second bandwidth part, the transceiver, in operation, additionally receives from the mobile terminal a random access message transmission using one of the plurality of random access transmission parameters which is associated to the by the mobile terminal selected and activated of the configured at least first bandwidth part or the second bandwidth part; and the processor, in operation, deactivates the remaining of the configured at least first bandwidth part and second bandwidth part which the mobile terminal has not selected and activated.

According to a twenty-third aspect, which can be combined with the eleventh aspect, the handover request message additionally includes:—information regarding at least a third bandwidth part and a different fourth bandwidth part which are configured for the mobile terminal in the source base station.

According to a twenty-fourth aspect, which can be combined with the twenty-third aspect, the handover request message additionally includes:—information regarding the activated one of the configured at least third bandwidth part and fourth bandwidth part in the source base station.

According to a twenty-fifth aspect, which can be combined with the twenty-fourth aspect, the processor, in operation, configures, for the mobile terminal, the first bandwidth part and the second bandwidth part, in the transceiver, based on the third bandwidth part and fourth bandwidth part, respectively.

According to a twenty-sixth aspect, which can be combined with the twenty-fifth aspect, the processor, in operation, controls the transceiver to transmit the handover request acknowledge message including a bandwidth part index, and the bandwidth part index indicates that bandwidth part which is the same as the previously activated one of the configured at least third bandwidth part and fourth bandwidth part in the source base station.

According to a twenty-seventh aspect, a method is proposed for performing a handover procedure of a mobile terminal in a mobile communication system from a source base station to a target base station. The target base station is configured for the mobile terminal with at least a first bandwidth part and a different second bandwidth part within its cell bandwidth. The method comprises the steps of: receiving from the source base station a handover command message including information regarding the configured at least first bandwidth part and second bandwidth part; and upon reception of the handover command message, activating at least a pre-selected one of the configured at least first bandwidth part or second bandwidth part, and communicating, over the activated at least one of the configured at least first bandwidth part or second bandwidth part, with the target base station as part of the handover procedure.

According to a twenty-eighth aspect, a method is suggested for performing a handover procedure of a mobile terminal in a mobile communication system from a source base station to a target base station. The target base station is configured for the mobile terminal with at least a first bandwidth part and a different second bandwidth part within its cell bandwidth. The method comprises the steps of: receiving from the source base station a handover command message including information regarding the configured at least first bandwidth part and second bandwidth part; and upon reception of the handover command message, selecting and activating at least one of the configured at least first bandwidth part or the second bandwidth part, and communicating, over the selected and activated at least one of the configured at least first bandwidth part or the second bandwidth part, with the target base station as part of the handover procedure.

According to a twenty-ninth aspect, a method is proposed for a target base station to perform a handover procedure of a mobile terminal in a mobile communication system from a source base station The target base station being capable of communicating with the mobile terminal over each of at least a first bandwidth part and a different second bandwidth part within its cell bandwidth. The method comprises the steps of: receiving from the source base station a handover request message including information regarding the capability of the mobile terminal to communicate over at least the first bandwidth part and second bandwidth part; and upon reception of the handover request message, configuring for the mobile terminal at least the first bandwidth part and the second bandwidth part, and transmitting to the source base station a handover request acknowledge message, wherein the handover request acknowledge message includes information regarding the configured at least first bandwidth part and second bandwidth part.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for controlling a target base station to perform a handover procedure of a user equipment from a source base station, the integrated circuit comprising:
  transceiver circuitry, which, in operation, receives from the source base station a handover request message which includes a traffic status of the user equipment and which includes information regarding the user equipment's capability to communicate with the target base station over a first bandwidth part and a second bandwidth part different from the first bandwidth part within a cell bandwidth of the target base station; and
  processing circuitry, which, in operation and upon reception of the handover request message, selects a bandwidth part index indicative of the first bandwidth part or the second bandwidth part, controls the transceiver circuitry to configure for the user equipment at least the first bandwidth part and the second bandwidth part, and controls the transceiver circuitry to transmit to the source base station a handover request acknowledge message, wherein the handover request acknowledge message includes information regarding the configured at least first bandwidth part and second bandwidth part which includes the selected bandwidth part index;
  wherein the bandwidth part index received by the source base station is transmitted in a handover command message from the source base station to the user equipment to activate the first bandwidth part or the second bandwidth part corresponding to the bandwidth part index, and
  wherein the handover command message includes a specific sequence of information, and the bandwidth part index to activate the first bandwidth part or the second bandwidth part is included at a specific position in the specific sequence.

2. The integrated circuit according to claim 1, wherein the processing circuitry, in operation and after controlling the transceiver circuitry to transmit the handover request acknowledge message, activates in the transceiver circuitry the first bandwidth part or the second bandwidth part corresponding to the selected bandwidth part index.

3. The integrated circuit according to claim 1, wherein the handover request message additionally includes information regarding a state of the activated bandwidth part or predicted traffic information.

4. The integrated circuit according to claim 1, wherein the processing circuitry, in operation and after controlling the transceiver circuitry to transmit the handover request acknowledge message, activates in the transceiver circuitry all of configured bandwidth parts including the first bandwidth part and the second bandwidth part.

5. The integrated circuit according to claim 1, wherein the handover request acknowledge message additionally includes:
  a plurality of different uplink shared channel transmission parameters, each associated with a different one of configured bandwidth parts including at least the first bandwidth part and the second bandwidth part; and
  the processing circuitry, in operation, controls the transceiver circuitry to schedule candidates of handover complete message transmission using all of the plurality of uplink shared channel transmission parameters which are associated with the configured bandwidth parts,
  wherein
  the plurality of uplink shared channel transmission parameters comprise time and frequency of radio channel resources, to be used by the user equipment when transmitting a handover complete message to the target base station; and
  in case the handover request acknowledge message additionally includes the plurality of uplink shared channel transmission parameters,
  the transceiver circuitry, in operation, additionally receives from the user equipment the handover complete message using one of the plurality of uplink shared channel transmission parameters which is associated with the first bandwidth part or the second bandwidth part activated by the user equipment; and
  the processing circuitry, in operation, deactivates the remaining configured bandwidth parts which the user equipment has not selected and activated.

6. The integrated circuit according to claim 1, wherein the handover request acknowledge message additionally includes:
  a plurality of different random access transmission parameters each associated with a different one of configured bandwidth parts including at least the first bandwidth part and the second bandwidth part; and
  the processing circuitry, in operation, controls the transceiver circuitry to reserve random access message transmissions using all of the plurality of random access transmission parameters which are associated with the configured bandwidth parts,
  wherein
  the plurality of random access transmission parameters comprise at least one or more of:
    a random access preamble sequence, or
    time and frequency of radio channel resources, to be used by the user equipment when transmitting a random access message to the target base station; and
  in case the handover request acknowledge message additionally includes the plurality of different random access transmission parameters,
  the transceiver circuitry, in operation, additionally receives from the user equipment the random access message using one of the plurality of random access transmission parameters which is associated with the first bandwidth part or the second bandwidth part selected and activated by the user equipment; and
  the processing circuitry, in operation, deactivates the remaining configured bandwidth parts which the user equipment has not selected and activated.

7. The integrated circuit according to claim 1, wherein the handover request message additionally includes:
  information regarding at least a third bandwidth part and a different fourth bandwidth part which are configured for the user equipment in the source base station; and
  information regarding the activated third bandwidth part or the activated fourth bandwidth part in the source base station;
  wherein the processing circuitry, in operation, controls the transceiver circuitry to configure, for the user equipment, the first bandwidth part and the second bandwidth part based on the third bandwidth part and fourth bandwidth part, respectively; and the bandwidth part index indicates the bandwidth part which is the same as the third bandwidth part or the fourth bandwidth part previously activated in the source base station.

* * * * *